United States Patent [19]

Mizutani et al.

[11] Patent Number: 4,666,488
[45] Date of Patent: May 19, 1987

[54] PROCESS OF PRODUCING A HIGHLY PURE GLASS TUBE

[75] Inventors: Futoshi Mizutani; Gotaro Tanaka; Hiroo Kanamori, all of Yokohama, Japan

[73] Assignee: Sumitomo Electric Industries, Ltd., Osaka, Japan

[21] Appl. No.: 833,193

[22] Filed: Feb. 27, 1986

[30] Foreign Application Priority Data

Mar. 6, 1985 [JP] Japan ................................. 50-44376

[51] Int. Cl.⁴ ...................... C03C 25/04; C03B 37/027
[52] U.S. Cl. ......................................... 65/3.12; 65/13; 65/18.2
[58] Field of Search ....................... 65/2, 3.12, 13, 18.2

[56] References Cited

U.S. PATENT DOCUMENTS 3,933,453  1/1976  Burke et al. .......................... 65/3.12
4,233,052  11/1980 Dominick et al. ..................... 65/13
4,486,212  12/1984 Berkey ................................. 65/2

Primary Examiner—Robert Lindsay
Attorney, Agent, or Firm—Cushman, Darby & Cushman

[57] ABSTRACT

A method of producing a highly pure glass tube having a smooth inner surface, said method comprising the steps of
  depositing by the flame hydrolysis of a glass-forming raw material, a first layer of glass soot particles having a bulk density no greater than 0.2 g/cm³ on a seed member having a smooth and clean outer surface,
  depositing on the surface of the first layer of glass soot particles, a second layer of glass soot particles having a bulk density greater than that of the first layer by at least 0.03 g/cm³,
  drawing the seed member from the deposited two-layered glass soot preform to form a tube of glass soot particles,
  removing the first inner layer of glass soot particles from the second layer, either simultaneously with or subsequent to the drawing of the seed member from the soot preform, and
  heating and vitrifying the tubular glass soot preform to form a transparent solid glass tube.

3 Claims, 5 Drawing Figures

4,666,488

PROCESS OF PRODUCING A HIGHLY PURE GLASS TUBE

BACKGROUND OF THE INVENTION

1. Field of the Invention

The present invention relates to a method of producing a highly pure glass tube. More particularly, it relates to a method of producing a highly pure glass tube having a smooth inner surface.

2. Description of the Prior Art

In the production of glass preforms for optical fibers, several methods have been proposed which comprise depositing fine particles of glass on a surface of a seed member which is in the form of a rod or a tube, drawing the seed member out of the deposited glass soot particles to form a hollow soot preform, and then heating and vitrifying the hollow soot preform to produce a solid glass preform. According to these conventional methods, because the inner surface of the soot preform should be smooth after drawing out the seed member, some measure must be taken on the seed member in order to prevent damage or peeling of the inner surface of the hollow glass preform. Alternatively, the bulk density of the soot preform near its inner surface must be adjusted so that the seed member is easily removed.

One conventional method, referred to here as the "first conventional method," utilizes a seed member made of a metal (e.g., aluminum) having a relatively large coefficient of thermal expansion. Because the metal seed member shrinks to a larger extent than does the hollow soot preform when it is cooled after deposition of the glass soot particles (a period of over several hours from a high deposition temperature to an ambient temperature), the seed member is easily removed from the deposited glass soot particles.

Another conventional method, referred to here as the "second conventional method," utilizes a seed member made of a ceramic material (e.g., $Al_2O_3$ and $ZrO_9$) highly resistant to corrosion and having a much smaller coefficient of thermal expansion than metal.

According to the first conventional method, during the deposition of the glass soot particles on the seed member, a corrosive gas, such as hydrogen chloride, is generated when the glass-forming raw material comprises $SiCl$. Such a gas corrodes the seed member.

Although the second conventional method can prevent the corrosion of the seed member, it is difficult to draw the seed member out of the deposited glass soot particles when the difference between the deposition temperature and the ambient temperature is not sufficiently large. In addition, ceramic materials are weak against thermal impulses. Accordingly, the seed member must be preheated before the deposition of the glass soot particles, which results in an increase in production costs. Furthermore, after several times of use, the ceramic seed member gradually cracks due to the heat load.

According to any of the conventional methods, the innermost layer of the hollow soot preform should have a comparatively high bulk density in order to prevent peeling of its inner surface during the drawing of the seed member. To achieve the necessary high bulk density in the innermost layer of the soot preform, the atmosphere near the seed member should be heated at a comparatively high temperature. However, at high temperatures, the deposited glass soot particles adhere strongly to the surface of the seed member so that a seed member made of, for example, quartz glass cannot be drawn without causing cracking or peeling of the glass soot preform.

SUMMARY OF THE INVENTION

An object of the present invention is to provide a method of producing a highly pure glass tube having a smooth inner surface.

Another object of the present invention is to provide a method of producing a highly pure glass tube from which a tubular solid glass preform having less cracking or peeling on its inner surface is produced.

Accordingly, the present invention provides a method of producing a highly pure glass tube, said method comprising the steps of depositing by the flame hydrolysis of a glass-forming raw material a first layer of glass soot particles having a bulk density no greater than 0.2 g/cm$^3$ on a seed member having a smooth and clean outer surface, depositing on the surface of the first layer of glass soot particles, a second layer of glass soot particles having a bulk density greater than that of the first layer by at least 0.03 g/cm$^3$, drawing the seed member from the deposited two-layered glass soot preform to form a tube of glass soot particles, removing the first inner layer of glass soot particles from the second layer, either simultaneously with or subsequent to the drawing of the seed member, and heating and vitrifying the tubular glass soot preform to form a transparent solid glass tube.

DETAILED DESCRIPTION OF THE DRAWINGS

The present invention will now be described by way of example, with reference to the accompanying drawings.

Figure 1A:
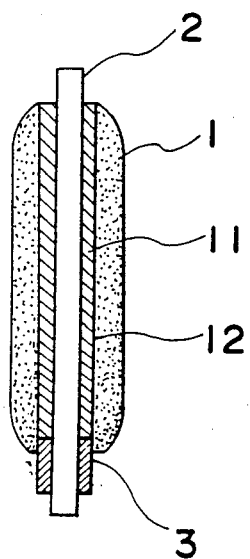
FIG. 1A is a cross-sectional view of a glass soot preform deposited on a seed rod according to the method of the present invention.

FIG. 1A is a cross-sectional view of a glass soot preform 1 which comprises a first layer 11 of the glass particles and a second layer 12 of the glass soot preform having been deposited on a seed rod 2 fixed to a supporting pipe 3.

Figure 2:
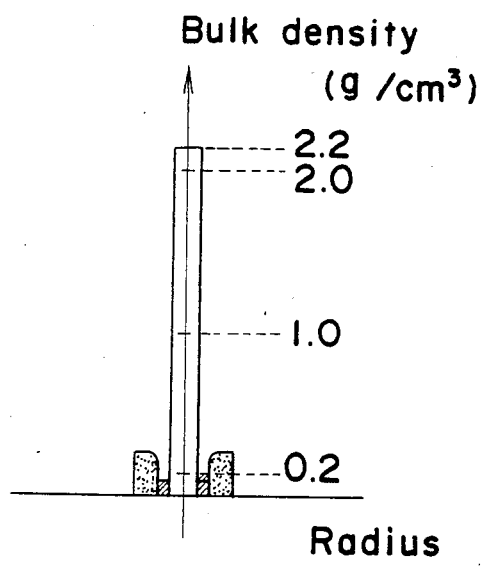
FIG. 2 illustrates the distribution of the bulk density of the glass soot preform deposited on the seed rod in a radial direction, FIG. 3 schematically illustrates a method of producing a tubular glass soot preform.

The distribution of the bulk density of a composite of the seed rod and the layers of the glass soot particles deposited thereon is shown in FIG. 2. The first layer 11 of the glass soot particles adjacent to the seed rod 2 has a bulk density which is no greater than 0.2 g/cm$^3$ and which is smaller by at least 0.03 g/cm$^3$ than that of the second outer layer 12 of the glass soot particles.

The glass soot particles are deposited according to one of the conventional methods, with the exception that the bulk density is adjusted as described above. For example, a burner to effect the flame hydrolysis of the glass-forming raw material may be passed along the length of the seed member in a reciprocal fashion in order to deposit pure silica glass soot particles thereon. In the first passage of the burner along the length of the seed member, the temperature of the glass soot particles being deposited is adjusted so as not to exceed 800° C. by controlling the flow rates of the glass-forming raw material and/or the fuel gases, the distance between the burner and the pertinent portion of the seed member and/or the speed with which the burner is moved along the length of the seed member. In the second and subsequent passage of the burner along the length of the seed member, the portion of the first layer of the glass soot particles on which the second layer is being deposited is heated at a higher temperature. The temperature difference corresponding to the bulk density difference of 0.03 g/cm$^3$ is about 40° C. To achieve a sufficient width in the second layer of the glass soot particles, the soot particles may be further deposited on the previous layer. Finally, a composite of the seed member 2 and the layers of the glass soot preform 1 is obtained as shown in FIG. 1A. This method may be described as a "multi-layer deposition method".

The seed member 2 is then drawn from the composite to obtain the tubular glass soot preform 1 which is fixed to the supporting pipe 3. At this stage, the inner surface of the glass soot preform 1 tends to be flawed or peeling because the first layer 11 of the preform, having a bulk density no greater than 0.2 g/cm$^3$, is very soft.

Thereafter, the first layer 11 of the soot preform is removed by injecting a suitable gas (e.g., nitrogen gas, air and the like) into the inner hollow portion of the soot preform so that the defects of the inner surface disappear. In order to achieve an even inner surface of the second layer and, in turn, a uniform inner diameter of the glass soot preform along its length, the difference in the bulk density between the first layer and the innermost portion of the second layer is preferably at least 0.03 g/cm$^3$. To prevent flaws or peeling of the inner surface of the second layer 12 during the removal of the first layer 11, the first layer is preferably at least a total of 0.2 mm thick and the degree of fluctuation of the outer diameter of the seed member and/or the distortion of the seed member.

Figure 1B:
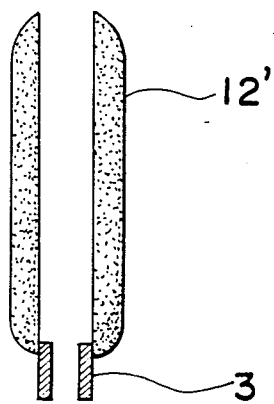
FIG. 1B is a cross-sectional view of a tubular glass soot preform from which the seed rod has been drawn and the first layer has been removed.

Finally, a tubular glass soot preform 12' having a smooth inner surface is obtained as shown in FIG. 1B. The preform 12' is heated and vitrified in a furnace to obtain a highly pure glass preform having a smooth inner surface.

Figure 3:
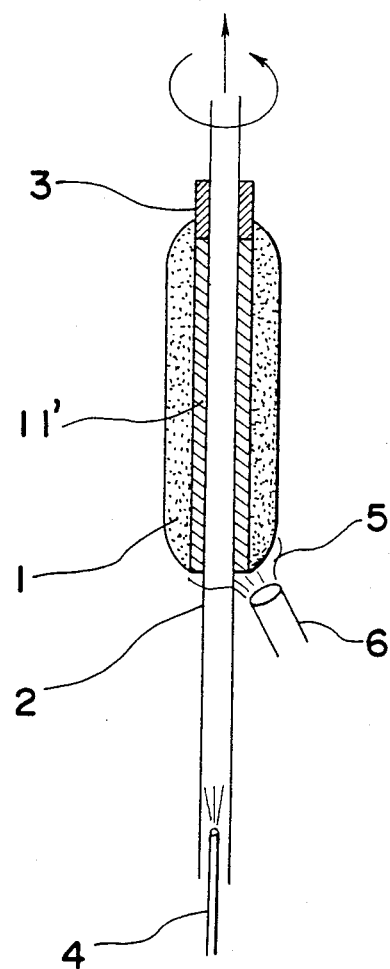

FIG. 3 illustrates the process of producing by a one-layer deposition method, a glass soot preform having the distribution of bulk density shown in FIG. 2. The numerals of FIG. 3 correspond to the same elements as in FIG. 1A. Numerals 5 and 6 represent a flame used to form glass soot particles and a burner, respectively.

In this case, the seed member 2 is of a tubular form, and a gas inlet tube 4 is inserted in the lower end of the tubular seed member 2. From the inlet tube 4, a cooling gas, such as nitrogen gas or air, is introduced. The tubular seed member is thereby cooled so that a first layer 11' of the glass soot particles is initially deposited at a lower temperature and in turn has a low bulk density of no greater than 0.2/cm$^3$. A second layer is then deposited at a comparatively high temperature. The seed tube is thereafter drawn and the first layer is removed by injecting a suitable gas into the inner hollow portion of the soot preform. The tubular soot preform is subsequently heated and vitrified in the furnace to obtain a highly pure tubular glass preform.

PREFERRED EMBODIMENTS OF THE INVENTION

The present invention will be described in further detail in the following examples.

EXAMPLE 1

SiCl$_4$, a glass-forming raw material, was emitted at a rate of 10 liter/minute from a burner from which oxygen gas, hydrogen gas and argon gas as a seal gas were emitted at the rates of 10 liter/minute, 8 liter/minute and 2 liter/minute, respectively, to effect the flame hydrolysis of the glass-forming raw material. Formed glass soot particles were deposited on a quartz glass rod having an outer diameter of 10 mm. The quartz glass rod was passed horizontally across the flame in a reciprocal fashion for a distance of 50 cm, at a speed of 10 cm/minute with a rotation of 30 rpm. The temperature of the surface on which the particles were being deposited in the first reciprocal passage was 580° C.

After one and a half reciprocal passages, the speed of the seed member was decreased to 4 cm/minute and the glass soot particles were deposited until the outer diameter of the soot preform reached 80 mm.

The bulk density of the deposited glass soot particles was measured by x-ray to find that the first layer of the preform adjacent to the seed member had a width of 0.4 mm and an average bulk density of 0.15 g/cm$^3$, and the second layer had an outer diameter of 80 mm and an average bulk density of 0.32 g/cm$^3$. The quartz glass seed rod was easily drawn from the glass soot preform to produce a tubular soot preform. Inspection of the inner surface of the preform revealed that parts of the inner surface were peeling. Nitrogen gas was then injected into the hollow portion of the soot preform to remove the first layer of the glass soot particles. A glass soot preform having a smooth inner surface without any flaw or peeling was produced.

The thus obtained soot preform was dehydrated and combined with fluorine by introducing it at a descending rate of 3 mm/minute in an atmosphere maintained at 1,100° C. in which helium gas, chlorine gas and SF$_6$ were injected at the rates of 5 liter/minute, 50 ml/minute and 200 ml/minute, respectively. The soot preform was then vitrified by introducing it at a descending rate of 4 mm/minute in an atmosphere maintained at 1,650° C. in which helium gas was injected at a rate of 10 liter/minute. A fluorine-containing quartz glass tube having smooth outer and inner surfaces and no bubbles therein was obtained.

EXAMPLE 2

A tubular glass soot preform was prepared according to the method described above, with reference to FIG. 3.

The seed member 2 consisted of an aluminum tube having an outer diameter of 20 mm and a wall thickness of 1.7 mm. The seed member was pulled upward with rotation in the direction of the arrow in FIG. 3. Glass soot particles were deposited on the surface of the seed tube by ejecting, from the burner 6, oxygen gas, hydrogen gas, argon gas as a seal gas and gaseous SiCl$_4$ at the rates of 12 liter/minute, 10 liter/minute, 2 liter/minute and 1 liter/minute, respectively. During the deposition of the glass soot particles, nitrogen gas was introduced into the seed tube at a rate of 3 liter/minute from a quartz tube 4 having an outer diameter of 5 mm and a wall width of 1.0 mm.

Figure 4:
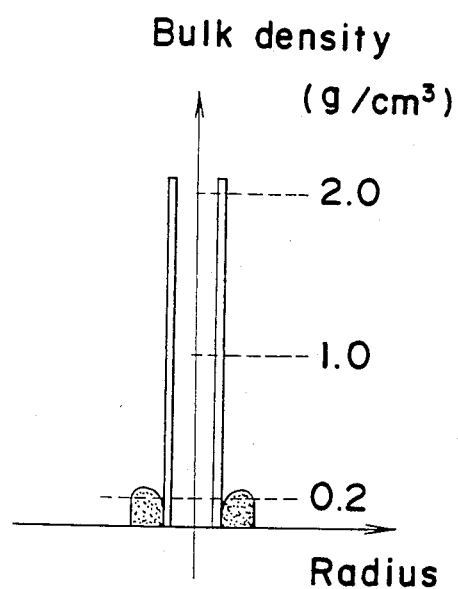
FIG. 4 illustrates the distribution of the bulk density of the glass soot preform deposited on the seed tube according to the method which is illustrated in FIG. 3.

After forming the glass soot preform around the seed member, the distribution of the bulk density of the composite was measured by X-ray to find that, as shown in FIG. 4, the inner layer had a low bulk density of 0.17 g/cm$^3$. The aluminum tube was then drawn from the soot preform and nitrogen gas was injected into the hollow portion of the soot preform in order to remove the inner layer of the soot particles with a low bulk density. A tubular soot preform with no unevenness or peeling on its inner surface was obtained.

The soot preform was dehydrated and combined with fluorine, and then vitrified in the same manner as in Example 1. A fluorine-containing quartz glass tube having smooth outer and inner surfaces and no cracking was obtained.

COMPARATIVE EXAMPLE 1

A glass soot preform was prepared in the same manner as in Example 1, with the exception that the deposition of the glass soot particles continued at the same rate as in the production of the first layer. The glass soot preform broke when its diameter reached 23 mm.

COMPARATIVE EXAMPLE 2

A glass soot preform was prepared in the same manner as in Comparative Example 1, with the exception that the seed member was passed along the flame at a rate or 4 cm/minute to obtain a soot preform having an outer diameter of 80 mm. However, the quartz glass seed rod and the soot preform were fused together so that the seed member could not be drawn from the soot preform.

COMPARATIVE EXAMPLE 3

A glass soot preform was prepared in the same manner as in Comparative Example 2, with the exception that zirconia seed tube having an outer diameter of 10 mm and a wall thickness of 1.7 mm was used. After heating its surface with a small burner for 30 minutes, the glass soot particles were deposited to obtain a soot preform having an outer diameter of 80 mm. After standing for 6 hours in order to cool, the seed member was drawn, and the hollow soot preform was dehydrated and combined with fluorine. The soot preform was then vitrified in the same manner as in Example 1. The obtained transparent tubular glass preform had many cracks, measuring to a depth of about 5 mm from its inner surface.

COMPARATIVE EXAMPLE 4

A glass soot preform was prepared in the same manner as in Example 2, with the exception that nitrogen gas was not introduced into the seed tube during the deposition of the glass soot particles. After standing for 6 hours in order to cool, the seed tube was drawn. However, much cracking and peeling was found on the inner surface of the tubular soot preform. The inner layer was removed by injecting nitrogen gas into the hollow portion of the soot preform. The soot preform was then dehydrated and combined with fluorine, and then vitrified in the same manner as in Example 1. The obtained transparent glass preform had a rough inner surface, with cracks measuring to a depth of about 3 mm.

What is claimed is:

1. A method for producing a highly pure glass tube comprising steps of
    depositing a first layer of glass soot particles having a bulk density of not larger than 0.2 g/cm$^3$ on a seed member having a smooth and clean outer surface by flame hydrolysis of a glass-forming raw material,
    depositing a second layer of glass soot particles having a bulk density larger than that of the first layer by at least 0.03 g/cm$^3$ on the surface of the first surface,
    drawing the seed member out of the deposited two layered glass soot preform to form a tube of glass soot particles,
    removing the first inner layer from the second layer simultaneously with or after the drawing of the seed member, and
    heating and vitrifying the tubular glass soot preform to form a transparent solid glass tube.

2. A method according to claim 1, wherein the glass soot particles consist of pure quartz, and the quartz glass soot particles are deposited by a multi-layer deposition method in which a temperature of the deposited soot particles of at least the first layer is kept at a temperature not higher than 800° C.

3. A method according to claim 1, wherein the seed member is of a tubular form, and the glass soot particles are deposited by a one-layer deposition method.

* * * * *

UNITED STATES PATENT AND TRADEMARK OFFICE
CERTIFICATE OF CORRECTION

PATENT NO. : 4,666,488

DATED : May 19, 1987

INVENTOR(S) : Futoshi MIZUTANI, et al

It is certified that error appears in the above-identified patent and that said Letters Patent is hereby corrected as shown below:

ON THE TITLE PAGE:

At Box [30], change the Japanese application No. "50-44376" to --60-44376--.

Signed and Sealed this

Nineteenth Day of January, 1988

Attest:

DONALD J. QUIGG

*Attesting Officer*  *Commissioner of Patents and Trademarks*